United States Patent [19]

Geno et al.

[11] Patent Number: 4,787,606
[45] Date of Patent: Nov. 29, 1988

[54] BEADLESS AIR SPRING

[75] Inventors: Wayne H. Geno, Cicero; Robert S. Harris, Indianapolis, both of Ind.

[73] Assignee: The Firestone Tire & Rubber Company, Akron, Ohio

[21] Appl. No.: 62,984

[22] Filed: Jun. 17, 1987

[51] Int. Cl.$^4$ ............................................. F16F 9/04
[52] U.S. Cl. ................................. 267/64.27; 267/64.24
[58] Field of Search .............. 267/64.19, 64.21, 64.23, 267/64.24, 64.27, 122, 153; 74/18.2; 29/453

[56] References Cited

U.S. PATENT DOCUMENTS

| 2,874,458 | 2/1959 | Smith | 29/436 |
| 2,977,134 | 3/1961 | Helling | 280/124 |
| 3,038,717 | 6/1962 | Bank | 267/65 |
| 3,074,709 | 9/1963 | Ballard et al. | 267/64.21 |
| 3,401,447 | 9/1968 | Knight | 29/453 |
| 3,788,628 | 1/1974 | Hotz, Jr. et al. | 267/64.24 |
| 3,790,147 | 2/1974 | Owen | 267/65 |
| 4,325,541 | 4/1982 | Korosladanyi | 267/65 |
| 4,506,910 | 3/1985 | Bierens | 280/711 |
| 4,564,177 | 1/1986 | Leonerd | 267/64.24 |

FOREIGN PATENT DOCUMENTS

| 0481826 | 6/1953 | Italy | 29/453 |
| 907555 | 10/1962 | United Kingdom . | |
| 2116667 | 9/1983 | United Kingdom | 267/64.27 |

Primary Examiner—Andres Kashnikow
Assistant Examiner—Richard Potosnak
Attorney, Agent, or Firm—Ronald Brietkrenz

[57] ABSTRACT

An air spring formed by a pair of spaced end members and an intervening tubular elastomeric sleeve forms a fluid pressure chamber therebetween for mounting between spaced portions preferably of a vehicle to provide damping and to absorb road shock on the vehicle. Each of the end members is provided with a surface formed with a series of convex projections and concave intervening areas which align with similarly shaped projections and concave areas on an adjacent snap ring. The snap rings compress the ends of the tubular sleeve against the corresponding end cap surfaces to provide a secure clamping engagement therewith. The various projections and surfaces form at least two radially spaced pinch areas on each of the end members and an intervening expansion area in combination with a squeeze area and subsequent terminal expansion area which ensures a change of direction of the reinforcement cords within the sleeve ends to securely clamp the sleeve ends therebetween. The expansion areas permit the elastomeric material of the sleeve to expand on both sides of the pinch areas. The combination of the pinch areas with adjacent expansion areas and squeeze areas provide for a secure end clamp and seal for the tubular sleeve without requiring any internal bead reinforcement.

7 Claims, 2 Drawing Sheets

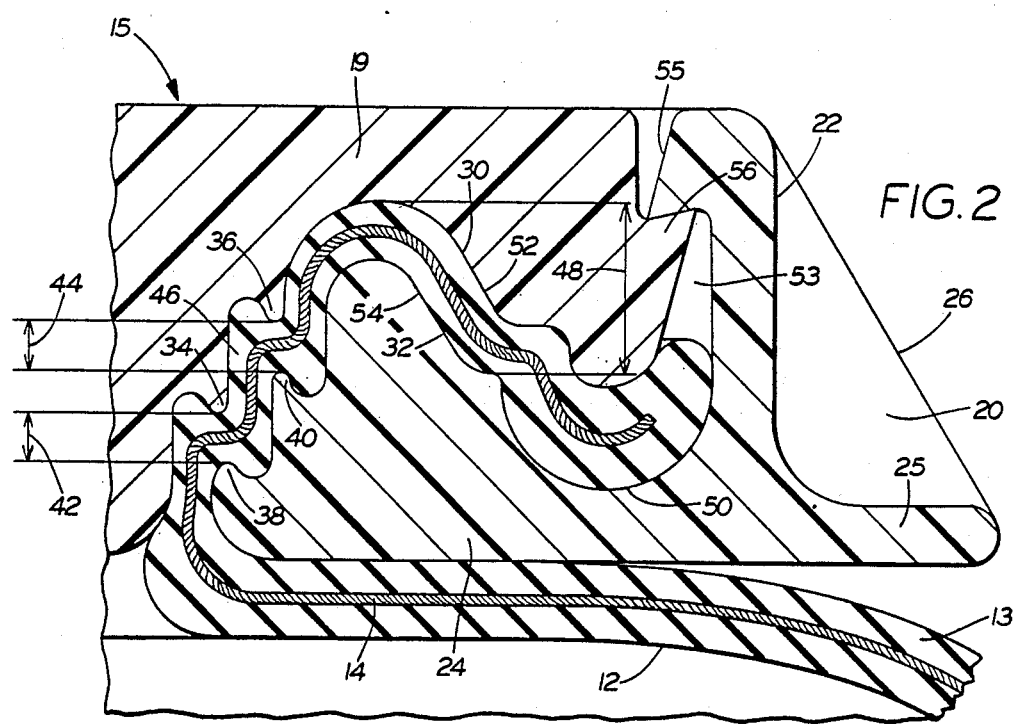

BEADLESS AIR SPRING

TECHNICAL FIELD

The invention herein resides in the art of air springs. More particularly, the invention relates to an air spring formed from a tubular elastomeric sleeve wherein sealing beads are mechanically formed at the ends thereof eliminating the heretofore required separate reinforcing beads mounted within the ends of the tubular sleeve.

BACKGROUND ART

Air springs are well known in the art and comprise an elastomeric sleeve which is maintained between a piston member at one end and an end cap assembly at the other end. Such air springs are adapted primarily for implementation in motor vehicles for supporting the vehicle body. The air springs are sealed at the ends to form a pressurized fluid chamber within the sleeve. Reinforcing beads previously have been molded about or within the peripheries of the sleeve ends to provide for a fluid tight seal with the piston and end cap assembly. It has also been known to seal the ends of the sleeve forming the air spring by means of complex mechanical structures, typically incorporating metallic plates and the like secured by means of bolts or other fastening means. These sealing structures are both time consuming and expensive in implementation.

Previously known structures of the general nature set forth herein are shown in U.S. Pat. Nos. 2,874,458; 2,977,134: 3,038,717: 3,790,147: 4,325,541; 4,506,910: and British Pat. No. 907,555. None of these references, however, teach an air spring which may be quickly and effectively formed from a tubular elastomeric sleeve without a separate reinforcing bead and wherein the bead is formed and sealed by simple engagement of snap-fitting together parts of metal and/or plastic. The teachings of the prior art have been expensive as to both time and material involved and, due to the metallic parts and separate bead rings previously used, have been a source of undesired weight in a vehicle.

Furthermore, in existing air spring as the internal pressure increases the separation forces acting on the sleeve end seals increases thereby limiting the amount of internal pressure which can be utilized for the air spring.

Accordingly, there is desire in the art for a simplistic and inexpensive air spring which is formed from a tubular elastomeric sleeve, the ends of which are sealed by mating parts which seal the unit and form a pressurized fluid chamber without requiring the installation of separate reinforcing beads within the sleeve ends during formation of the tubular sleeve.

DISCLOSURE OF THE INVENTION

In light of the foregoing, it is a first aspect of the invention to provide an air spring without separate mechanical reinforcing beads molded within the ends of the sleeve.

Another aspect of the invention is the formation of an air spring wherein the beads are formed from the elastomeric material of the sleeve ends by the clamping engagement of mating members.

Still a further aspect of the invention is to provide an air spring wherein compressive forces on the spring and the force exerted by the trapped fluid tighten the clamping action of the end mating members against the formed beads.

An additional aspect of the invention is the formation of an air spring in which the mating end members and piston may be molded of plastic or similar materials, greatly reducing both weight and cost of the air spring.

Still another aspect of the invention is providing an air spring which may be formed by snap-fitting together the end components which seal the tubular sleeve without nuts, bolts, or other torque-applied connectors.

A further aspect of the invention is the sealing of the end members with the sleeve ends by forming a series of spaced pinch points or areas in the ends of the elastomeric tube by the configuration of the mating members in combination with expansion and squeeze areas which change the direction of reinforcing cords molded within the sleeve ends which distributes the pulling force caused by the internal air pressure within the sleeve across the various pinch areas to enable the mating end members to withstand greater internal fluid pressure than heretofore possible without the use of separate reinforcing bead rings.

Another aspect of the invention is the formation of an air spring wherein the molding of a separate bead reinforcement within the ends of the sleeve is completely eliminated with the bead reinforcement function being provided by the series of pinch areas and expansion areas affected by the mating end components.

The foregoing and other aspects of the invention which will become apparent as the detailed description proceeds are achieved by an air spring, the general nature of which may be stated as including; a tubular elastomeric sleeve having first and second ends, said ends being devoid of a bead: end cap means for securing said tubular sleeve at said first end; and piston means for securing said tubular sleeve at said second end.

Other aspects of the invention are achieved by an air spring the general nature of which may be stated as including; first and second end members adapted to be mounted at spaced locations on structures movable with respect to each other; a flexible sleeve formed of an elastomeric material containing reinforcing cords and having first and second open ends sealing engaged with the first and second end members, respectively, forming a pressurized fluid chamber therebetween; the first end member having an end cap extending within the first open end of the sleeve and a clamp ring extending about said first sleeve end in clamped engagement with said end cap compressing the sleeve material therebetween; and at least two annular curved projections formed on mating surfaces of the end cap and clamp ring compressing the sleeve therebetween in a generally axial direction, and an intervening area between said projections to permit the sleeve material to expand therein.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

FIG. 2 is an enlarged fragmentary sectional view of the interconnection of the end cap and clamp ring of the upper end cap assembly of the air spring of FIG. 1; and FIG. 3 is an enlarged fragmentary sectional view similar to FIG. 2 of the interconnection of the piston base with a clamp ring of the lower end of the air spring of FIG. 1.

Similar numerals refer to similar parts throughout the drawings.

BEST MODE FOR CARRYING OUT THE INVENTION

Figure 1:
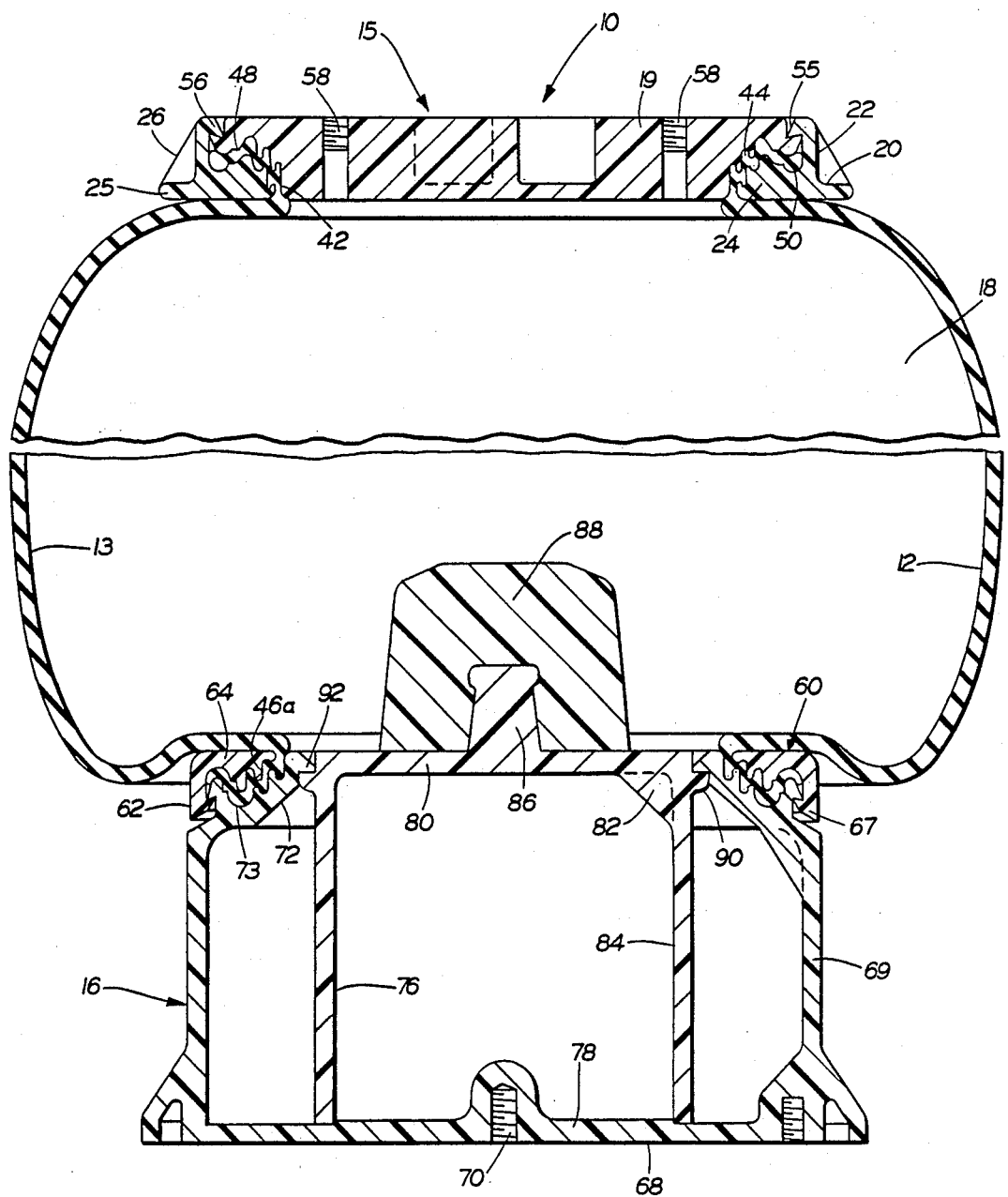
FIG. 1 is a fragmentary vertical cross-sectional view of the improved air spring of the invention.

Referring now to the drawings and more particularly to FIG. 1, the improved air spring of the invention is indicated generally at 10. The center portion of air spring 10 is formed by a cylindrical tubular-shaped sleeve 12 which is formed to an appropriate length from suitable elastomeric material 13 containing reinforced fabric formed by biased cords 14, shown only in FIGS. 2 and 3, without a separate reinforcing bead being molded into either end of the sleeve as in prior art sleeve constructions. An end cap assembly and a piston assembly indicated generally at 15 and 16, respectively are secured to sleeve 12 at opposite ends thereof. Cap assembly 15 and piston assembly 16 are adapted to be secured to portions of a vehicle or other spaced structures between which relative movement is to be dampened. The uses of the air spring of the instant invention are no different from those previously known, the invention herein residing in the structure and more particularly the sealing of the sleeve ends to form a pressurized fluid chamber 18 therein.

As shown, end cap assembly 15 comprises a disc-shaped end cap 19 interconnected with an annular clamp ring 20. Ring 20 comprises a cylindrical side wall 22 which is normal and upstanding to an annular base 24 such that the two in combination define a general J-shape in cross-section. Ribs or webs 26 extend diagonally between cylindrical side wall 22 and an outward extending annular lip 25 of base 24 for strengthening ring 20.

In accordance with the main feature of the invention a plurality of mating projections and surfaces are formed along generally curved mating surfaces 30 and 32 of end cap 19 and clamping ring 20 as shown particularly in FIG. 2. As shown in FIG. 2, a pair of radially spaced convexly curved projections 34 and 36 are formed on plate surface 30 and are axially aligned with and spaced from generally similarly shaped convexly curved projections 38 and 40, respectively, formed on surface 32 of clamp ring 20 which provides a pair of axial separations 42 and 44 therebetween hereafter referred to as "pinch areas". The axial separation between the aligned projections preferably is approximately eighty percent of the uncompressed thickness of sleeve material 13. The area indicated at 46, extending generally axially between pinch areas 42 and 44 is referred to as an "expansion area" and has a separation between the mating surfaces thereof which is equal to or greater than the thickness of the uncompressed sleeve material. As shown in FIG. 2 the internal reinforcing cord 14 changes direction of generally 90° when moving between each of the pinch areas and the intervening expansion area.

Furthermore, a generally diagonally extending area 48 hereinafter referred to as a "squeeze area" is formed radially outwardly beyond the last pinch area 44 which has a separation distance between opposed surface segments 52 and 54 less than the thickness of the uncompressed sleeve material and equal to or greater than the separation distances of pinch areas 42 and 44. Squeeze area 48 terminates in an expansion area 50 having a somewhat irregular configuration as shown in FIG. 2 in which the opposed surfaces which define expansion area 50 have a separation greater than the thickness of the uncompressed sleeve material. Expansion area 50 enables the elastomeric material which is squeezed in squeeze area 48 to expand outwardly and flow into area 50. As shown in FIG. 2 an upper portion 53 of expansion area 50 may not be filled with sleeve material, and provides for some variances in the mounting of the sleeve end between clamp ring 20 and end cap 19 thereby ensuring sufficient area for the expansion and flow of elastomeric sleeve material upon leaving the squeeze area 48 and pinch areas 42 and 44.

Thus, the unique configured mating surfaces 30 and 32 of end cap 19 and clamp ring 20, respectively, provides for a pair of pinch areas with an intervening expansion area followed by a squeeze areas which then terminates in a terminal expansion area whereby the elastomeric material which is compressed in the pinched areas and squeeze area will flow into the expansion areas 46 and 50. Since the rubber or elastomeric material 13 is generally incompressible after reaching a certain amount of compression, these expansion areas are provided to ensure a proper clamping action between end cap 19 and ring 20 at the spaced pinch areas for securely clamping the sleeve therein. The change of direction of the fabric cord 14 as it moves through the spaced pinch areas and intervening expansion area, and through the squeeze area and into the final expansion area is believed to assist greatly in resisting the disengagement of the clamped sleeve material from between end cap 19 and ring 20. Finally, a snap lip 55 is provided at the end of cylindrical side wall 22 and extends inwardly toward the center of ring 20 and engages a similarly shaped undercut angular beveled lip 56 formed on the outer edge of end cap 19. End cap 19 is formed with a plurality of threaded holes 58 for securing the end cap to a vehicle or the like (FIG. 1).

With continued reference to FIGS. 1 and 2, it can be seen that end cap 19 may be easily positioned at the end of the sleeve 12. To do so, the bead ring 20 is first slid over the outer periphery of elastomeric sleeve 12 a predefined distance. With the inner diameter of the ring 20 being less than the outer diameter of the sleeve 12, the rubber of sleeve 12 is drawn inwardly within the ring. Next, the end cap 19 is brought within the end opening of sleeve 12 as it extends through ring 20, securing the elastomeric material of the sleeve between the outer peripheral contoured edge of end cap 19 and the generally similarly shaped inner mating edge of ring 20. The clamping forces developed between the concentric projections of these peripheral surfaces in the pinch areas in combination with the squeeze area and expansion areas prevent sleeve 12 from slipping or moving while end cap 19 is engaged with ring 20. Also the radially spaced axial compression areas and associated expansion areas form a reverse bend as shown in FIGS. 2 and 3 with respect to the adjacent uncompressed portion of the sleeve ends. This relationship provides increased frictional resistance to movement of the sleeve end from between mating surfaces 30 and 32 of end cap 19 and clamp ring 20. As shown, the elastomeric material is squeezed or distorted in the spaces defined between the mating or opposed surfaces of end cap 19 and ring 20 with cord 14 continuously changing directions. Accordingly, a compressive fit is achieved and maintained when snap lip 56 is deflected past snap lip 55 until final secured engagement is achieved as shown in the drawing.

At the opposite end of air spring 10, the piston assembly is assembled in somewhat similar fashion as is end cap assembly 15, as can be seen from FIGS. 2 and 3. Here a clamp ring 60 is provided with a cylindrical side wall 62 and an annular base portion 64 as is clamp ring 20 described above. Again, the side wall and base define a general J-shape in cross-section. A plurality of concentric projections and intervening concave surfaces of various diameters are provided about an inner clamping surface 66 of base portion 64 of clamp ring 60 as on surface 32 of clamp ring 20 and therefor are not described in detail. An undercut annular snap lip 67 is also provided for substantially the same purposes as discussed above with respect to lip 55 of ring 20.

Piston assembly 16 is defined by an outer cylindrical base 69 which is closed at one end by an end plate 68 which is provided with threaded screw holes 70 or the like for securing the unit to a vehicle or other desired place of operation. End plate 68 would also typically be provided with a nipple or pressure valve for connecting to a pressure source for pressurizing chamber 18 of spring 10. An open edge portion of cylindrical base 69 is defined by a conical section 72, an outer surface 73 of which is formed with generally the same spaced convexly curved upwardly extending projections and intervening concave portions as in surface 30 of end cap 19 to define a pair of pinch areas 42a and 44a similar to pinch areas 42 and 44 discussed above. Furthermore, an intervening expansion zone 46a is formed between the pinch areas similar to area 46. Correspondingly a squeeze area 48a is formed similar to squeeze area 48 described above. Also the squeeze area then terminates in an enlarged expansion area 50a in a similar reverse bend relationship as described above.

The operation and function of the pinch areas, the intermediate expansion area, together with the end expansion area of piston assembly 16 is the same as that described above with respect to pinch zones 42 and 44, intermediate expansion area 46, squeeze area 48 and end expansion area 50 of end cap assembly 15 and therefore are not described in further detail. Furthermore, the relationship and distances between the aligned and mating surfaces of clamp ring 60 and conical section 72 are generally the same as that of end cap 19 and clamp ring 20. A snap lip 75 is provided about an outer end portion of conical section 72 of piston base 66 for receipt and snap-fitting engagement with lip 67 of clamp ring 60. For ease of assembly, both lips 67 and 75 are beveled as shown in FIG. 3.

Received within the cylindrical base 69 is a bumper stand 76 which is mounted upon end plate 68, snugly receiving a raised area 78 of plate 68 therein. Area 78 assures proper registration of the stand 76 within the spring assembly 10. An end plate 80 caps one end of the base 69, with flanges 82 extending between the plate 80 and a cylindrical side wall 84 for strength and rigidity. A pin 86 extends centrally from the plate 80 for receiving a rubber bumper 88 which prevents total collapse or deflection of the spring assembly.

A snap lip ring 90 encompasses an upper end portion of the cylindrical base 76 just below the top of plate 80. Snap lip ring 90 is characterized by a beveled lower edge to assist in allowing it to pass by the snap lip ring 92 extending from conical section 72 of base 69. Snap lip 92 is similarly beveled for ease of assembly.

As may be appreciated from FIGS. 1 and 3, piston assembly 16 of air spring 10 is then assembled in substantially the same manner as described above with respect to end cap assembly 15. The sleeve 12 is necked down and through clamp ring 60 to a particular distance. Base 69, is then brought into engagement with clamp ring 60, compressing the sleeve material between the opposed concentric surfaces of conical section 72 and annular base 64.

It will be readily appreciated that, in operation, end cap plate assembly 15 and piston assembly 16 are secured to relatively movable members such as on a vehicle. It will also be understood that fluid pressure chamber 18 defined by the sleeve 12 is pressurized to provide the spring action. With movement of the end cap assembly 15 and piston assembly 16 relatively restricted, the pressure force within chamber 18 exerts radial, rather than axial force on the mating seals defined by the spaced concentric projection maintaining compressed sleeve material therebetween. This axial force tends to increase the effectiveness of sealing or clamping action as the internal pressure increases.

Accordingly, the improved beadless air spring is simplified, provides an effective safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved beadless air spring is constructed and used, the characteristics of the construction and the advantageous, new and useful results obtained; the new and useful structures, devices, elements, arrangements, parts and combinations are set forth in the appended claims.

What is claimed is:

1. An improved air spring including:
   (a) first and second end members adapted to be mounted at spaced locations on structure moveable in a general axial direction with respect to each other;
   (b) a flexible, generally tubular-shaped sleeve formed of an elastomeric material containing reinforcing cords and having first and second open ends sealingly engaged with the first and second end members, respectively, forming a chamber therebetween for containing a pressurized fluid wherein a longitudinal centerline axis of said sleeve extends in the axial direction between said end members;
   (c) the first end member having an end cap extending within the first open end of the sleeve and a clamp ring extending about said first sleeve end, said end cap and clamp ring having opposed mating surfaces extending in a generally transverse radial direction with respect to the sleeve axis and being in clamped engagement with said sleeve end axially compressing said sleeve end therebetween; and (d) at least two annular curved axially extending projections formed on each of the opposed mating surfaces of the end cap and clamp ring and spaced in a stepped radial direction with respect to each other compressing said end of the sleeve therebetween in the axial direction, and an intervening area formed between said projections having a greater axial separation than an axial separation between the projections to permit the sleeve material to expand therein, and a third generally diagonally extending compression area formed between said opposed mating surfaces radially outwardly beyond the axially extending projections terminating in an additional expansion area, whereby said compressed sleeve end extends generally radially outward in the same direction as an uncompressed sleeve area adjacent the compressed sleeve end to form a reverse bend so the clamped sleeve end can withstand the forces exerted by the pressurized fluid within the sleeve chamber due to the radially spaced axial compression areas and friction provided by the reverse bend on the compressed sleeve end.

2. The air spring defined in claim 1 in which the sleeve cords change direction between the two compressing areas and intervening expansion area.

3. The air spring defined in claim 1 in which the direction of the sleeve cords remain generally unchanged in the diagonally area.

4. The air spring defined in claim 1 in which the clamp ring and end cap have mutually engaged annular snap lips to clamp said cap and ring together in a sealed engagement with the intervening sleeve material.

5. The air spring defined in claim 4 in which the snap lips have undercut mutually engageable surfaces.

6. The air spring defined in claim 1 in which the end cap and clamp ring are formed of plastic.

7. The air spring defined in claim 1 in which the axial spacing between the mating projections is approximately 80% of the thickness of the sleeve material.

* * * * *

UNITED STATES PATENT AND TRADEMARK OFFICE
CERTIFICATE OF CORRECTION

PATENT NO. : 4,787,606

DATED : November 29, 1988

INVENTOR(S) : Geno et al.

It is certified that error appears in the above-identified patent and that said Letters Patent is hereby corrected as shown below:

Column 4, line 36, "angular" should read --annular--;

Column 8, line 8, after "diagonally" insert --extending compression--.

Signed and Sealed this

Ninth Day of May, 1989

Attest:

DONALD J. QUIGG

Attesting Officer

Commissioner of Patents and Trademarks